United States Patent
Tice

(10) Patent No.: US 9,764,459 B1
(45) Date of Patent: Sep. 19, 2017

(54) HANDLE REPLACEMENT SYSTEM FOR HAND TOOLS

(71) Applicant: Alfred Tice, Granville Summit, PA (US)

(72) Inventor: Alfred Tice, Granville Summit, PA (US)

( * ) Notice: Subject to any disclaimer, the term of this patent is extended or adjusted under 35 U.S.C. 154(b) by 0 days.

(21) Appl. No.: 15/287,943

(22) Filed: Oct. 7, 2016

(51) Int. Cl.
*A01B 1/02* (2006.01)
*B25G 3/36* (2006.01)
*B25G 3/26* (2006.01)
*A01B 1/06* (2006.01)

(52) U.S. Cl.
CPC .......... *B25G 3/36* (2013.01); *A01B 1/02* (2013.01); *A01B 1/06* (2013.01); *B25G 3/26* (2013.01)

(58) Field of Classification Search
CPC ........................................... B25G 3/36
USPC ............... 294/57, 58, 49, 50.7, 50.8, 50.9; 172/371, 372
See application file for complete search history.

(56) References Cited

U.S. PATENT DOCUMENTS

| | | | | |
|---|---|---|---|---|
| 930,660 A * | 8/1909 | Gifford | .............. | E01H 5/02 294/54.5 |
| 1,196,663 A * | 8/1916 | Clore | .............. | A01B 1/08 172/371 |
| 1,211,176 A * | 1/1917 | Kinzel | .............. | B29C 45/14008 425/126.1 |
| 2,419,719 A * | 4/1947 | Kennedy | .............. | A01B 1/06 172/372 |
| D190,870 S | 7/1961 | Blankenship | | |
| 3,466,078 A * | 9/1969 | Sholund | .............. | A01B 1/22 16/426 |
| D245,664 S * | 9/1977 | Holcombe | .............. | 294/49 |
| 4,406,559 A | 9/1983 | Geertsema et al. | | |
| 4,829,857 A | 5/1989 | Jones | | |
| 5,120,098 A * | 6/1992 | Childress | .............. | A01B 1/028 254/131.5 |
| 5,415,448 A | 5/1995 | Keathley | | |
| 5,447,289 A * | 9/1995 | Callahan | .............. | B25C 11/00 254/131 |
| 5,826,929 A | 10/1998 | Tisbo et al. | | |
| 6,598,334 B1 * | 7/2003 | Edevold | .............. | A01K 97/01 294/179 |
| 6,988,561 B1 * | 1/2006 | Campbell | .............. | A01B 1/08 15/235.4 |
| 7,017,234 B2 * | 3/2006 | Anderson | .............. | E05B 75/00 16/319 |
| 8,220,852 B2 | 7/2012 | Fenstemaker | | |
| 8,746,767 B2 | 6/2014 | Mouch et al. | | |
| 2005/0242598 A1 * | 11/2005 | Pin | .............. | A01B 1/026 294/58 |

* cited by examiner

*Primary Examiner* — Paul T Chin

(57) ABSTRACT

A handle replacement system for manipulating earth includes a handle that may be manipulated. The handle comprises dimensional lumber. A head is removably coupled to the handle. Thus, the head may manipulate earth. The head is structured to receive dimensional lumber.

6 Claims, 5 Drawing Sheets

HANDLE REPLACEMENT SYSTEM FOR HAND TOOLS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98.

The disclosure and prior art relates to handle devices and more particularly pertains to a new handle device for manipulating earth.

BRIEF SUMMARY OF THE INVENTION

An embodiment of the disclosure meets the needs presented above by generally comprising a handle that may be manipulated. The handle comprises dimensional lumber. A head is removably coupled to the handle. Thus, the head may manipulate earth. The head is structured to receive dimensional lumber.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
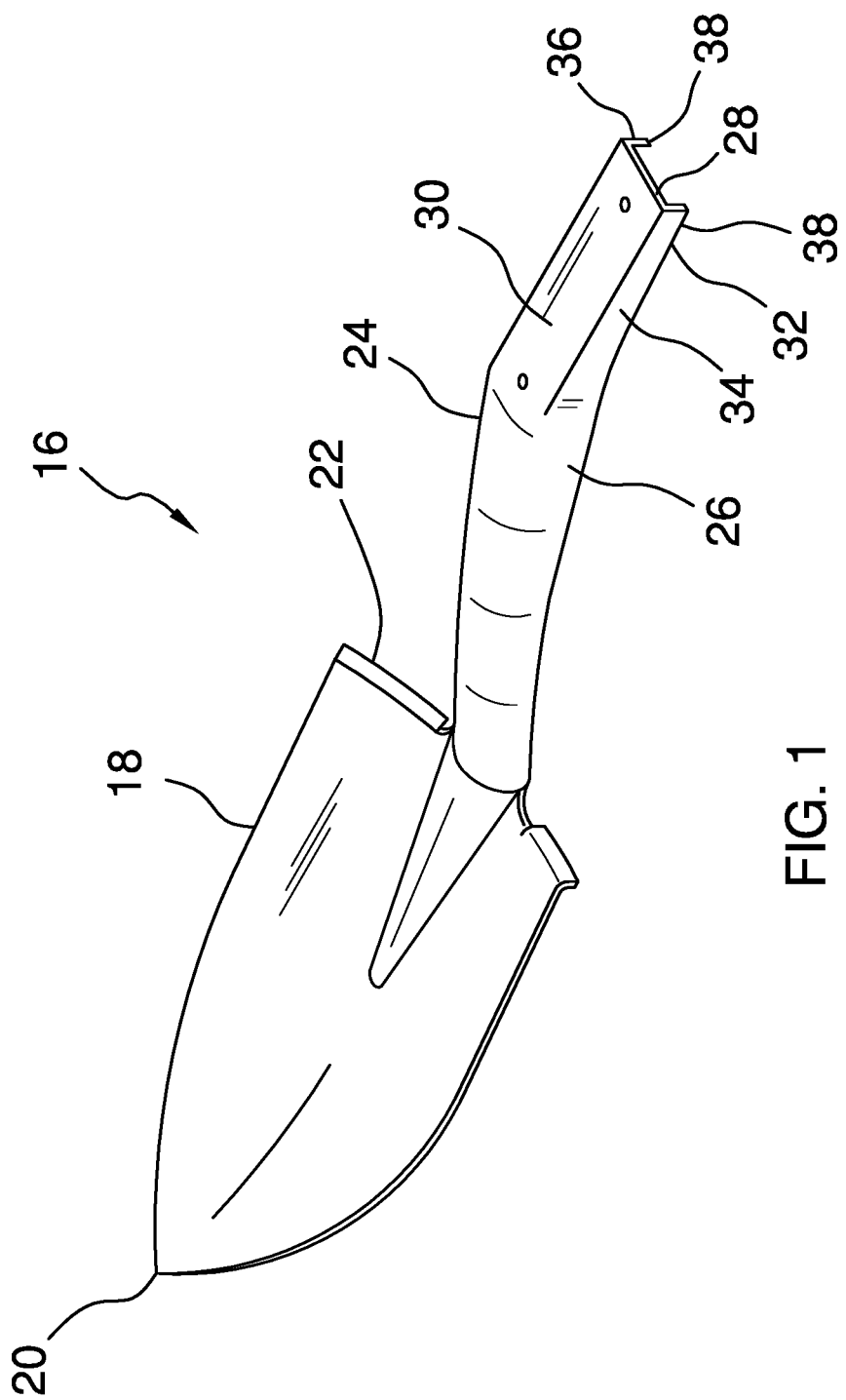
FIG. 1 is a perspective view of a handle replacement system according to an embodiment of the disclosure.
Figure 2:
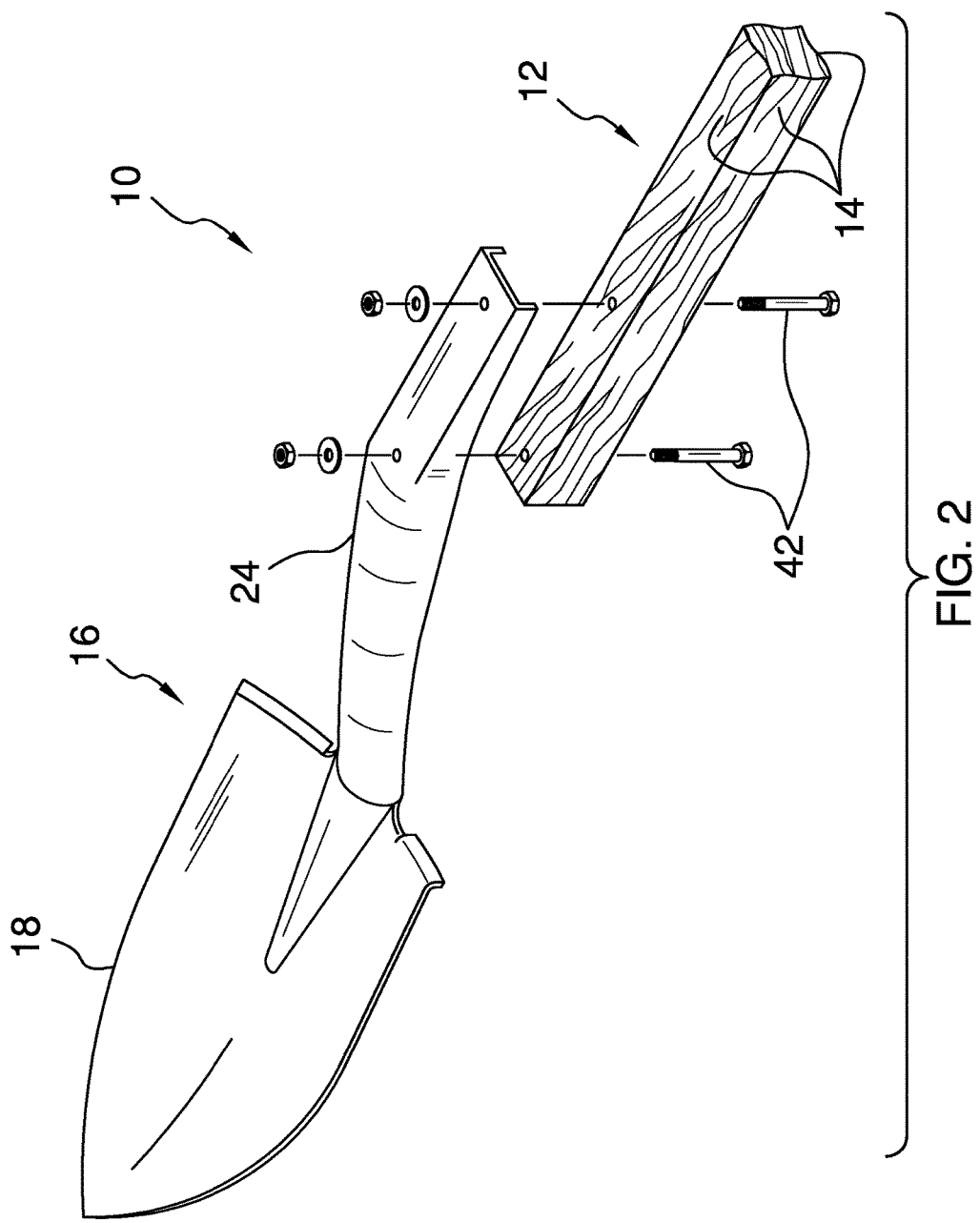
FIG. 2 is an exploded perspective view of an embodiment of the disclosure.
Figure 3:
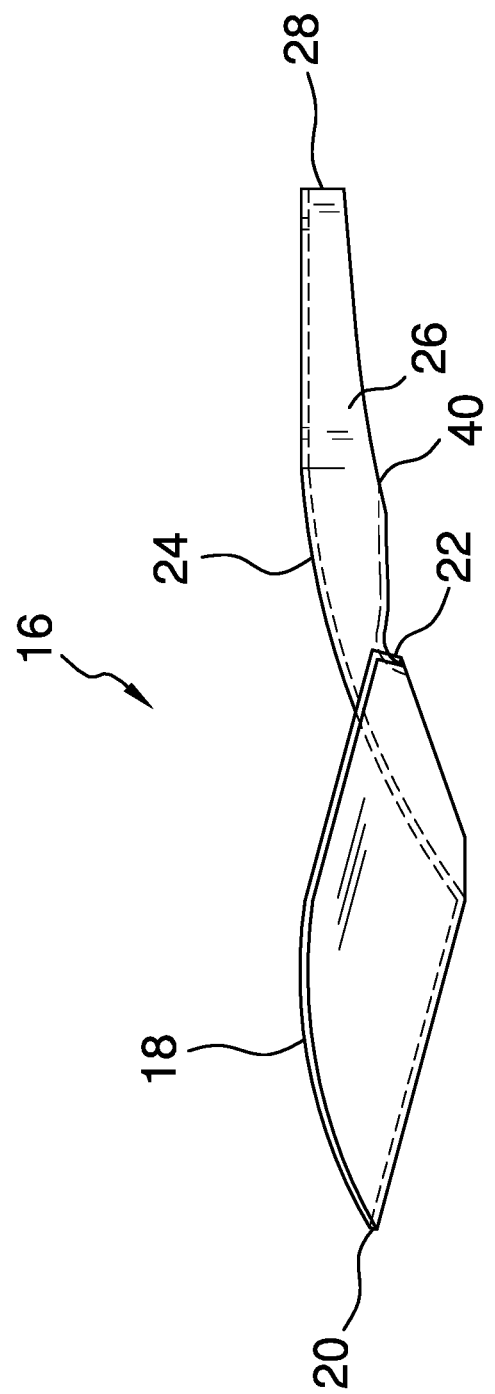
FIG. 3 is a left side view of a head of an embodiment of the disclosure.
Figure 4:
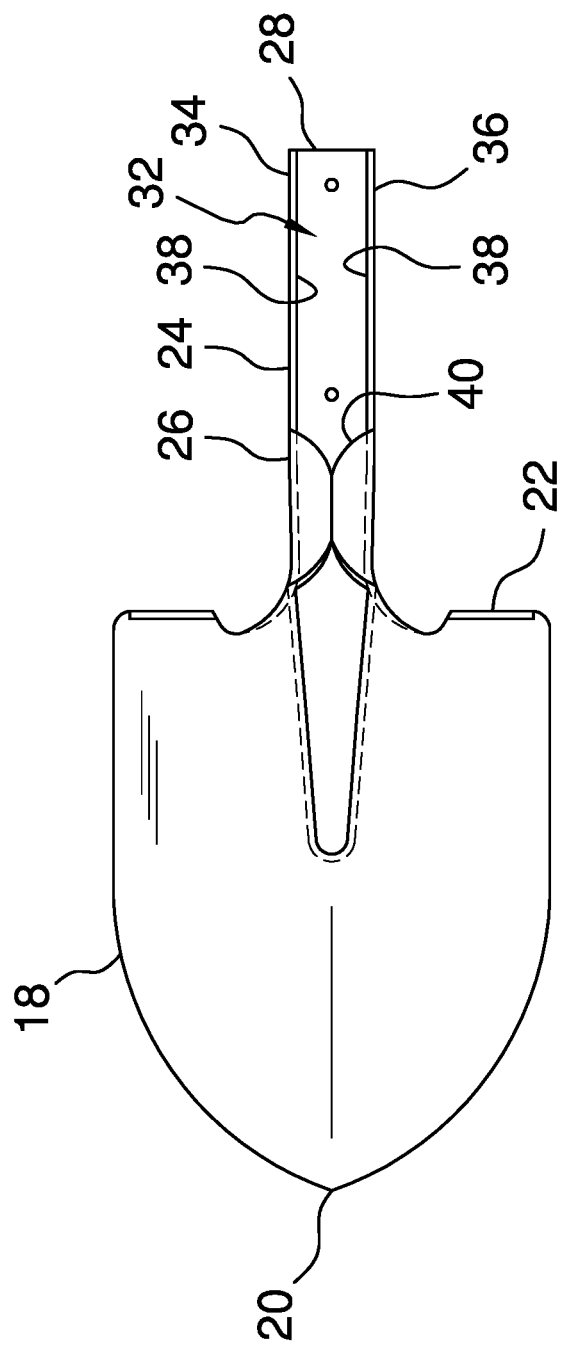
FIG. 4 is a bottom view of head of an embodiment of the disclosure.

With reference now to the drawings, and in particular to FIGS. 1 through 5 thereof, a new handle device embodying the principles and concepts of an embodiment of the disclosure and generally designated by the reference numeral 10 will be described.

As best illustrated in FIGS. 1 through 5, the handle replacement system 10 generally comprises a handle 12 that may be manipulated. The handle 12 comprises dimensional lumber such as a 2×4 or the like. The handle 12 has a plurality of intersecting sides 14 such that the handle 12 has a rectangular cross section taken along a longitudinal axis. The handle 12 may be cut to a selected length.

A head 16 is provided. The head 16 is removably coupled to the handle 12. Thus, the head 16 may manipulate earth for the purposes of digging or the like. The head 16 is structured to receive the dimensional lumber. Thus, the handle 12 may be replaced with dimensional lumber when the handle 12 breaks.

The head 16 comprises a blade 18 that has front end 20 and a back end 22. The blade 18 tapers to a point at the front end 20. Thus, the blade 18 may penetrate and scoop earth. The blade 18 may comprise a dirt shovel or the like.

A ferrule 24 is coupled to and extends away from the back end 22 of the blade 18. The ferrule 24 has an outer wall 26 and a distal end 28 with respect to the blade 18. Moreover, the ferrule 24 may be curved between the back end 22 and the distal end 28. Thus, the ferrule 24 enhances leverage between the handle 12 and the blade 18.

The outer wall 26 has a top side 30, a bottom side 32, a first lateral side 34 and a second lateral side 36. The bottom side 32 is open and the distal end 28 is open. Each of the first lateral side 34 and the second lateral side 36 extend downwardly from the top side 30. Thus, the ferrule 24 has a rectangular cross section taken along an axis extending through the distal end 28 and the back end 22 of the blade 18.

Each of the first lateral side 34 and the second lateral side 36 has a distal edge 38 with respect to the top side 30. The distal edge 38 corresponding to each of the first lateral side 34 and the second lateral side 36 angles upwardly toward the top side 30 between the head 16 and the distal end 28. Each of the first lateral side 34 and the second lateral side 36 may have a height ranging between twelve mm and twenty five mm. Additionally, the top side 30 may have a width ranging between two cm and five cm. The ferrule 24 may have a length ranging between twelve cm and seventeen cm.

Each of the first lateral side 34 and the second lateral side 36 wrap around the bottom side 32 adjacent to the back side of the blade 18 to define a stop 40. The stop 40 is spaced from the distal end 28 of the ferrule 24. The handle 12 is removably inserted into the distal end 28 of the ferrule 24 having the handle 12 abut the stop 40. Each of the top side 30, the first lateral side 34 and the second lateral side 36 abuts an associated one of the interesting sides 14 of the handle 12. Thus, the handle 12 is restrained in the ferrule 24.

A pair of fasteners 42 is provided. Each of the fasteners 42 extends through the top side 30 of the ferrule 24 and engages the handle 12. Thus, the handle 12 is removably retained on the head 16. Each of the fasteners 42 may comprise a nut and a bolt or the like.

Figure 5:
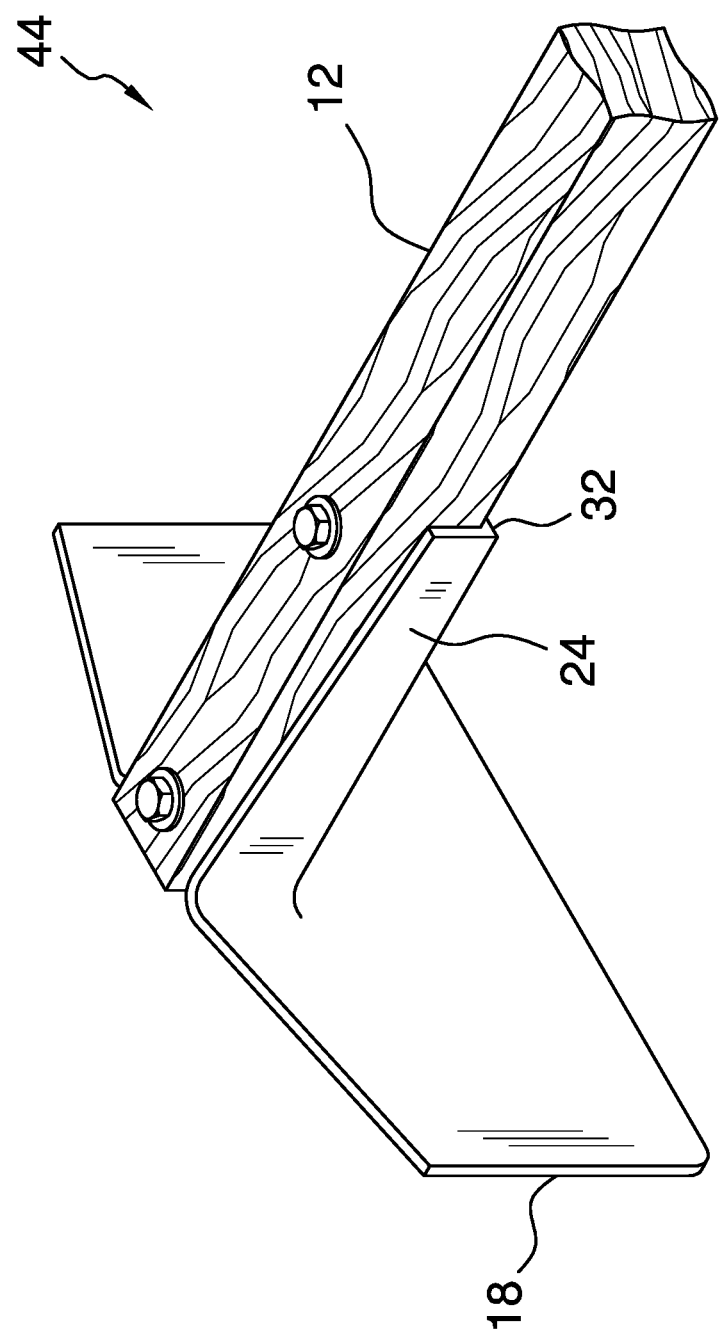
FIG. 5 is a perspective view of an alternative embodiment of the disclosure.

In an alternative embodiment 44 as shown in FIG. 5, the blade 18 may extend downwardly from the ferrule 24 to define a hoe. The bottom side 32 of the ferrule 24 may be closed and the top side 30 of the ferrule 24 may be open. The handle 12 may be inserted into the top side 30 of the ferrule 24. Each of the fasteners 42 may extend through the bottom side 32 of the ferrule 24 and engages the handle 12.

In use, the handle 12 is inserted into the ferrule 24. Each of the fasteners 42 is extended through the ferrule 24 and engages the handle 12. Thus, the handle 12 is removably coupled to the ferrule 24. The handle 12 is replaced with dimensional lumber when the handle 12 breaks thereby enhancing a service life of the head 16. Moreover, the handle 12 is replaced with dimensional lumber commonly found on construction sites or the like.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A handle replacement system for hand tools, said system comprising:
   a handle being configured to be manipulated, said handle comprising dimensional lumber;
   a head being removably coupled to said handle wherein said head is configured to manipulate earth, said head being structured to receive dimensional lumber;
   said head comprises a blade having front end and a back end, blade tapering to a point at said front end wherein said blade is configured to penetrate and scoop earth; and
   a ferrule being coupled to and extending away from said back end of said blade, said ferrule having an outer wall and a distal end with respect to said blade, said outer wall of said ferrule being curved between said back end of said blade and said distal end of said ferrule such that said blade is positioned rearwardly offset from a longitudinal axis of said handle, said outer wall having a top side, a bottom side, a first lateral side, a second lateral side, said bottom side being open, said distal end being open, each of said first lateral side and said second lateral side extending downwardly from said top side such that said ferrule has a rectangular cross section taken along an axis extending through said distal end and said back end of said blade.

2. The system according to claim 1, wherein said handle has a plurality of intersecting sides such that said handle has a rectangular cross section taken along a longitudinal axis.

3. The system according to claim 1, wherein each of said first lateral side and said second lateral side has a distal edge with respect to said top side, said distal edge corresponding to each of said first lateral side and said second lateral side angling upwardly toward said top side between said head and said distal end.

4. The system according to claim 1, wherein said handle has a plurality of intersecting sides, said handle being removably inserted into said distal end such that each of said top side, said first lateral side and said second lateral side abuts an associated one of said intersecting sides of said handle.

5. The system according to claim 1, further comprising a pair of fasteners, each of said fasteners extending through said top side of said ferrule and engaging said handle such that said handle is removably retained on said head.

6. A handle replacement system for hand tools, said system comprising:
   a handle being configured to be manipulated, said handle comprising dimensional lumber, said handle having a plurality of intersecting sides such that said handle has a rectangular cross section taken along a longitudinal axis; and
   a head being removably coupled to said handle wherein said head is configured to manipulate earth, said head being structured to receive dimensional lumber, said head comprising:
      a blade having front end and a back end, blade tapering to a point at said front end wherein said blade is configured to penetrate and scoop earth,
      a ferrule being coupled to and extending away from said back end of said blade, said ferrule having an outer wall and a distal end with respect to said blade, said outer wall of said ferrule being curved between said back end of said blade and said distal end of said ferrule such that said blade is positioned rearwardly offset from a longitudinal axis of said handle, said outer wall having a top side, a bottom side, a first lateral side, a second lateral side, said bottom side being open, said distal end being open, each of said first lateral side and said second lateral side extending downwardly from said top side such that said ferrule has a rectangular cross section taken along an axis extending through said distal end and said back end of said blade, each of said first lateral side and said second lateral side having a distal edge with respect to said top side, said distal edge corresponding to each of said first lateral side and said second lateral side angling upwardly toward said top side between said head and said distal end, said handle being removably inserted into said distal end such that each of said top side, said first lateral side and said second lateral side abuts an associated one of said intersecting sides of said handle, and a pair of fasteners, each of said fasteners extending through said top side of said ferrule and engaging said handle such that said handle is removably retained on said head.

* * * * *